United States Patent [19]

Poirier d'Ange d'Orsay et al.

[11] 4,183,397

[45] Jan. 15, 1980

[54] VEHICLE AIR CONDITIONING DEVICE

[75] Inventors: Emmanuel J. Poirier d'Ange d'Orsay, Toulouse; René H. Paradis, Nogent le Rotrou, both of France

[73] Assignees: Societe pour l'Equipement de Vehicules, Issy Moulineaux; Societe Anonyme Francaise du Ferodo, Paris, both of France

[21] Appl. No.: 895,023

[22] Filed: Apr. 10, 1978

[30] Foreign Application Priority Data

Apr. 15, 1977 [FR] France ............................ 77 11484

[51] Int. Cl.² ............................................ F25B 29/00
[52] U.S. Cl. ...................................... 165/14; 165/43; 137/869; 236/84
[58] Field of Search ............... 165/14, 42, 43; 236/13, 236/84; 62/244; 137/869, 870, 875

[56] References Cited

U.S. PATENT DOCUMENTS 3,199,536   8/1965   Thompson ..................... 137/869 X

FOREIGN PATENT DOCUMENTS 1405880 12/1968 Fed. Rep. of Germany ............. 165/42
2445590  3/1975 Fed. Rep. of Germany ............. 165/43
1444950  8/1976 United Kingdom ....................... 165/42

Primary Examiner—Samuel Scott
Assistant Examiner—Margaret A. Focarino
Attorney, Agent, or Firm—Brisebois & Kruger

[57] ABSTRACT

An air conditioning device for an automobile vehicle includes the provision for automatic proportional control of the air conditioning function and also a priority function such as vehicle windscreen demisting or defrosting. Economy of pneumatic power is achieved by providing, with a double threshold control system, a signal for operating pneumatic flow distributors in the driving fluid lines to pneumatic jacks driving the control elements of the air conditioning device by means of an electrical signal which is capable of being either continuous or discontinuous in which latter state the flow distributor to which the discontinuous signal is applied is caused to oscillate to achieve an intermediate pneumatic pressure between pressure values corresponding to fully open and fully closed positions of the air conditioning control elements to be manipulated.

22 Claims, 14 Drawing Figures

VEHICLE AIR CONDITIONING DEVICE

It is known that the more luxuriously equipped types of automobile vehicle it is desirable to achieve air conditioning, with automatic temperature control which takes into account the wishes of the user, the outside air temperature and the cabin air temperature of the vehicle. This air conditioning must nevertheless make it possible, at the user's wish, to carry out priority functions such as defrosting or demisting the windscreen. The air conditioning devices of this type are generally of complex construction and of high cost.

It is an object of the present invention to provide a device of this type which is of simpler construction than the similar known devices of the prior art.

In the known type of air conditioning device the distribution of the conditioning air and the mixing of the hot air with the cold air are in general effected by means of pivoting flaps whose movements must be controlled in a suitable manner. The control of the movement of a flap can be achieved by a "stepping" electric motor whose rotor can be positioned in accordance with an electrical signal, but in view of the number of flaps required in a conditioning installation this method of control is considered too expensive. It has already been proposed that pneumatic jacks be used as the flap actuators; the movable piston of such a jack being subjected from one side to the action of a spring and from the other side to the action of a gas (usually air) under pressure. The pressure applied to the piston is either insufficient to compress the spring or sufficient to overcome the said spring, so that the jack functions on an "all or nothing" basis and does not allow proportional positioning of the flap associated with the jack. To achieve such proportional or gradual positioning of the flap, it would be necessary to use a pressure or suction modulator but this type of apparatus is too expensive.

In general, these jacks are associated with an accumulator reservoir to allow them to function when the engine is stopped or idling. If a jack associated with a suction modulator is used for control, the pressure of the accumulator reservoir is used up throughout the control, so the system rapidly becomes inoperative. It is an object of this invention to provide an air conditioning device which uses, for the control of the adjusting flaps, jacks which operate on an "all or nothing" basis, avoiding the use of a suction modulator, whilst nevertheless achieving a gradual movement of the flaps.

According to the present invention there is provided a device for air conditioning an enclosed space with at least one mode of automatic temperature control, such device comprising an air circulating fan; different flow paths for air through the device; at least one heat exchanger through which the conditioning air can pass as it travels along at least one of said paths; movable means being provided for regulating the temperature or directing the flow of conditioning air along said different possible circulation paths in the device; at least two fluid pressure operated actuators; two electromagnetic valves associated with the actuators of the device so that each actuator is controlled by at least one of said electromagnetic valves and is effective to drive said movable means, each of said electromagnetic valves having three ports $S_0$, $S_1$, and $S_2$, the ports $S_0$ and $S_1$ being connected when the electromagnetic valve is de-energised whilst the ports $S_0$ and $S_2$ are connected when the electromagnetic valve is energised with a control signal, at least one communication being provided between the paths $S_0S_1$ of each of the two electromagnetic valves, the ports $S_2$ of the two electromagnetic valves being connected to two fluid feeds which are at different pressures, and at least one of said actuators being connected to each of the ports $S_0$. Preferably, to avoid any risk of pumping or hunting of the control system, and in order thus to reduce the energy consumed during functioning of the device, the device of this invention uses, in a manner which is in itself known, a double threshold control system. Thus, when the measured value of the control parameter is within a predetermined control band around a reference value of the said parameter, it is considered that satisfactory control has been achieved and that there is no further need to alter the position of the adjusting flaps.

The cost of the device according to the invention has been limited by ensuring that, in spite of the large number of actuators required for controlling the adjusting flaps, it is possible to manage with only two electromagnetic valves. This is particularly valuable from an economic point of view, but in order to make it possible, with only two electromagnetic valves, to achieve not only automatic control but also at least one priority function such as windscreen defrosting or demisting it is preferable to interconnect the two.

Given that it is desired to achieve automatic control by employing a first pressure $P_1$ (for example atmospheric pressure) and a second pressure $P_2$ (for example a lower pressure present in a suction accumulator reservoir) it is thus necessary to achieve a proportional or gradual movement of the adjusting flaps. Although this may be achieved in a known manner by interposing an orifice or throttle in the feed lines of the jacks, we now propose to achieve this result by controlling the feed to the jack by means of an electromagnetic valve whose movable valve member is subjected to an alternating movement by means of a discontinuous signal of relatively low frequency, for example preferably from 0.5 to 100 Hz applied to the actuator of the valve.

In a preferred embodiment, when the device according to the invention functions by automatic control, the electromagnetic valves do not receive any control signal as long as the measured value of a parameter of the air conditioning to be achieved does not deviate from a reference value of the said parameter by more than a predetermined amount Δ. In this way, any pumping or hunting of the control system is avoided and the consumption of energy required for the said control is reduced because the flaps are kept immobile whilst the measured value of the control parameter is within the predetermined range. Where the electromagnetic valves controlled by a discontinuous electrical signal of low frequency are used, the position of an adjusting flap is varied gradually because of the fact that the pressure which acts on the flap actuator is between the two pressures $P_1$ and $P_2$ connected to the two electromagnetic valves, the value of this intermediate pressure varying gradually at a speed which is determined by the mark/space ratio of the low frequency signal.

If the electromagnetic valves are controlled by a low frequency discontinuous electric signal, it is advantageous that this signal be a square wave signal. The ports $S_2$ of the two electromagnetic valves are connected to two pneumatic feeds. The actuators of the movable means for directing the flow of conditioning air are advantageously pneumatic jacks, the piston rods of which are spring biased. The movable means for directing the flow of conditioning air can advantageously be pivoting flaps, the pivoting of each flap being controlled by the piston rod of the respective jack. One of the electromagnetic valves of the device is connected to a pressure accumulator reservoir containing air at a pressure other than atmospheric pressure (for example sub atmospheric pressure,) whilst the other electromagnetic valve is connected to atmospheric pressure.

Desirably the device may function in accordance with several said modes of automatic control. In a first mode, intended to economise energy, the conditioning air is not cooled and can be warmed by a heat exchanger. In a second mode, which is less economical but of higher performance, the conditioning air can be cooled by passing through a vaporiser of a refrigeration circuit. The air circulation fan, of the device may, for example, be located between the air inlets and the said air warming heat exchanger. Preferably, the device comprises two heat exchangers, namely an air cooling vaporiser associated with a compressor for refrigerant fluid, and an air warming radiator, the compressor and radiator being arranged in this sequence in the path of the conditioning air, and the compressor being disenabled in a mode of operation corresponding to "economical" automatic control. The operation of the device, in the automatic control mode, can be such as to use as the control parameter either the position of the cold air/hot air mixing flap or, more preferably, either the temperature of the conditioning air entering the enclosed space to be conditioned, or the temperature of the air already in this space.

The air conditioning device according to the invention may thus comprise a mode of automatic control which carries out one priority function such as windscreen demisting in which all of the air being controlled is directed towards a single group of conduits, for example towards the vehicle windscreen. The device according to the invention may even provide for two such priority functions, namely a screen demisting function and a screen defrosting function, in which the hot air is directed towards a single group of conduits, for example leading to the windscreen. The demisting function can be achieved by inverting the mark/space ratio k of one of the two square wave signals used to actuate each of the electromagnetic valves in the defrosting mode. In addition to the two above-mentioned priority functions, the device may comprise an instantaneous stop function in which the refrigeration compressor and the air fan are stopped and certain actuators are in an extreme, so-called "recycling", position.

At least one of the actuators of the device may be associated with a flow distributor and control a feed valve to an air-warming heat exchanger, the flow distributor being controlled by a cam associated with the pivoting flap which determines the amount of conditioning air which must pass across the said heat exchanger. At least one of the actuators of the device may be associated with a flow distributor which controls a means for determining the entry into the device of fresh air from the outside or recycled air from the inside of the enclosed space to be conditioned, this flow distributor being controlled by a cam which is associated with the pivoting flap and determines the amount of conditioning air which must pass across the air-warming heat exchanger. It is also possible to ensure that the actuator which controls the hot air/cold air mixing flap, determining the amount of air which must pass across the air-warming heat exchanger, at the same time controls a flap which can isolate said heat exchanger from the downstream zone of the device when the mixing flap prevents the conditioning air from entering the heat exchanger. One actuator of the device can control a flap which has one extreme position resulting in the supply of conditioning air only to the "face vent" air nozzles of the enclosed space to be conditioned, and another extreme position resulting in the feed of conditioning air to the top and bottom ventilation conduits which correspond, respectively, to the windscreen of the vehicle and to the feet of the front occupant, where the enclosed space to be conditioned is the cabin of an automobile vehicle. One of the electromagnetic valves of the device may advantageously control an actuator for the distribution of the conditioning air between top and bottom ventilation conduits located opposite the windscreen zone of the vehicle, the cabin of which vehicle constitutes the enclosed space to be conditioned.

The electrical control of the electromagnetic valves of the device may conveniently be achieved by an electronic circuit in which a comparator continuously compares the measured value of the control parameter with a reference value of the said control parameter, and the output of the comparator feeds a double threshold circuit which provides at least one electrical signal if the output of the comparator is not between the above-mentioned two thresholds, the said signal, modulated or non-modulated, being used to control the electromagnetic valve; the reference value of the regulating parameter can be obtained by means of a calculator which takes into account the outside air temperature, the cabin temperature selected by the user and the actual temperature measured inside the enclosed space to be conditioned.

In order that the present invention may more readily be understood, several embodiments thereof will now be described by way of purely illustrative and non-limiting examples, with reference to the accompanying drawings, in which:

FIGS. 1a, 1b, 1c and 1d schematically represent four operational states of a first embodiment of the air conditioning device according to the invention;

Figure 1A:
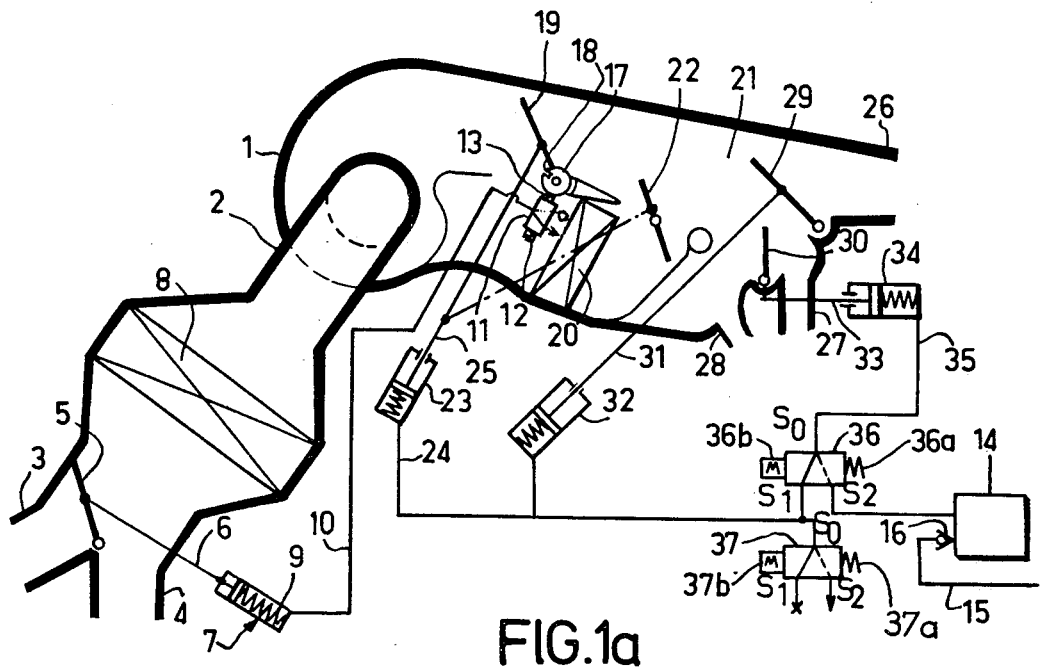

Referring firstly to FIGS. 1a, 1b, 1c and 1d, there will be seen the fan 1 of a first embodiment of the air conditioning device according to the present invention. The fan 1 is a centrifugal blower which is fed axially in its central zone by a channel 2 which guides conditioning air to the fan. The channel 2 receives the conditioning air either (a) from a recycling or cabin air extraction conduit 3 which takes the air from the enclosed space (in this case the cabin of an automobile) to be conditioned in which case the conditioning air will undergo a closed cycle, or (b) a fresh air inlet conduit 4 which is open to the atmosphere. The conduits 3 or 4 are alternately opened by means of a pivoting flap 5 controlled by the piston rod 6 of a jack 7. Between the pivoting flap 5 and the inlet to the fan 1, and inside the channel 2, is an air-cooling heat exchanger 8 which can act as a vaporiser. The heat exchanger 8 comprises a bundle of tubes fed with a fluid which can evaporate, with concomitant absorption of heat into the tube bundle, the said fluid being, in a known manner, reconverted to the liquid state in a separate condenser by means of a compressor before being recycled into the tube bundle of the air-cooling heat exchanger 8. The feed circuit of the air-cooling heat exchanger 8 has not been shown in detail in the drawings.

Like all the other jacks in the device according to the invention, the jack 7 comprises a movable piston rod 6 and a spring 9 which exerts a return biasing action on the rod 6. The jack 7 is fed through an air line 10 from a flow distributor 11 whose movable member is subjected to the action of a spring 12 and of a tappet 13. When the tappet 13 is forced into its seat, corresponding to the compressed state of the spring 12, the air line 10 is connected to the atmosphere; in the converse case the tappet 13 is able to projects from its seat under the action of the spring 12, shifting the movable member of the distributor 11, and bringing the air line 10 into communication with a suction accumulator reservoir 14 in which a sub-atmospheric air pressure, supplied along a suction line 15 equipped with the one-way valve 16, is maintained. The tappet 13 cooperates with a rotary cam 17, which has a recess 18 into which the tappet 13 can enter to permit the just described movement of the movable member of the flow distributor 11 under the action of the spring 12. The rotary cam 17 is fixed to a pivoting flap 19 known as the "mixing flap".

The flap 19 is located in the outlet duct of the fan 1 and can, in the two extreme positions of its pivoting movement, either direct the whole of the air propelled by the fan along the direction of an air-warming heat exchanger 20, across which the said air can pass, or conversely prevent the passage of air onto the air-warming heat exchanger. The heat exchanger 20 is located in an air flow path which is parallel to that along which the air is propelled when it does not pass across the air-warming heat exchanger. These two parallel paths divide at the flap 19 which, in its intermediate positions, regulates the distribution of the air output from the fan between the two possible parallel flow paths; the two parallel paths are recombined in a zone 21 downstream from the heat exchanger 20. At this zone 21 is a butterfly flap 22 which, depending on its position, can either recombine the air streams of the two parallel circulation paths to unite them in the zone 21, or conversely can isolate the flow through the heat exchanger 20 from the zone 21.

The movements of the flaps 19 and 22 are linked and both flaps are controlled by a common jack 23 fed through an air line 24. The piston rod 25 of this jack 23 simultaneously controls the two flaps 19 and 22 so that when the flap 19 directs all the propelled air onto the heat exchanger 20, the flap 22 leaves the connection between the air-warming heat exchanger 20 and the zone 21 wide open, and when the flap 19 prevents any propelled air from passing onto the heat exchanger 20 the flap 22 isolates the said heat exchanger 20 from the zone 21. This simultaneous control of the two flaps 22 and 19 ensures that when the flap 19 is positioned so as to by-pass the heat exchanger 20, the flap 22 is in a corresponding position which isolates the zone 21 from the back of (i.e. the downstream side of) the heat exchanger 20 so as also to avoid any heating of the propelled air by contact with the rear face of the heat exchanger.

The fan outlet air, which is introduced into the mixing zone 21, is then distributed between the different distribution paths which have been provided for the conditioning air. For conditioning the cabin of a vehicle, there are provided, on the one hand, "face vent" air outlets for the atmosphere in the cabin, and, on the other hand, ventilation channels, some of which pass upwards to discharge the air towards the windscreen, whilst others direct the air towards the feet of the vehicle occupants. The mixing zone 21 can thus feed (a) the face vents through a conduit 26, (b) the windscreen ventilation air (for demisting or defrosting purposes) through a conduit 27, and (c) the ventilation air to be directed towards the feet of the occupants of the front of the vehicle, through a conduit 28. The outlet air from the mixing zone 21 is distributed between the conduits 26, 27 and 28 by means of two distribution flaps. Of these, a first pivoting flap 29 has extreme positions, which make it possible to feed either the conduit 26 or the conduits 27 and 28, and another pivoting flap 30 makes it possible to choose between feeding the conduits 27 or 28. The flap 29 is controlled by a piston rod 31 of a jack 32 fed through the line 24; the flap 30 is controlled by the piston rod 33 of a jack 34 fed through a line 35.

The air lines 24 and 35 are connected to two identical electromagnetic (i.e. solenoid operated) valves 36 and 37. Each of these electromagnetic valves has in its valve body three ports $S_0$, $S_1$ and $S_2$, and has a movable valve member making it possible to bring into communication, depending on the position of this valve member, either the ports $S_0$ and $S_1$, or the ports $S_0$ and $S_2$. The movable valve member is subjected to the action of a spring 36a or 37a respectively, which push the movable valve member so that in the absence of any other force, the movable valve member is biased into the position in which it makes the connection $S_0S_1$. Each movable valve member is controlled by a respective solenoid 36b and 37b which can be energised by an appropriate electrical signal to cause the movable valve member to move and compress the corresponding spring 36a or 37a, to make the connection $S_0S_2$. The line 35 is connected to the port $S_0$ of the electromagnetic valve 36. The suction accumulator reservoir 14 which contains a subatmospheric pressure is connected to the port $S_2$ of the electromagnetic valve 36, and the line 24 is connected to the port $S_1$ of the electromagnetic valve 36 and to the port $S_0$ of the electromagnetic valve 37. The port $S_1$ of the electromagnetic valve 37 is blanked off by a plug and the port $S_2$ of the electromagnetic valve 37 is connected to atmosphere.

The device which has just been described makes it possible, by appropriate control of the electromagnetic valves 36 and 37 and of the power supply to the motor driving the fan 1 and to the compressor associated with the heat exchanger 8, either to achieve automatically controlled air conditioning or to carry out a priority function such as windscreen defrosting. In automatic control, it is possible either to carry out normal air conditioning or to carry out "economical air conditioning", or to carry out air conditioning with demisting of the windscreen. The "economical air conditioning" only differs from normal conditioning in that the cooling function by means of the exchanger 8 is disenabled by preventing the start-up of the compressor. Apart from this difference, the "normal" and "economical" modes of air conditioning operation are identical and the corresponding position of the components of the device will be as shown in FIG. 1a.

Figure 1B:
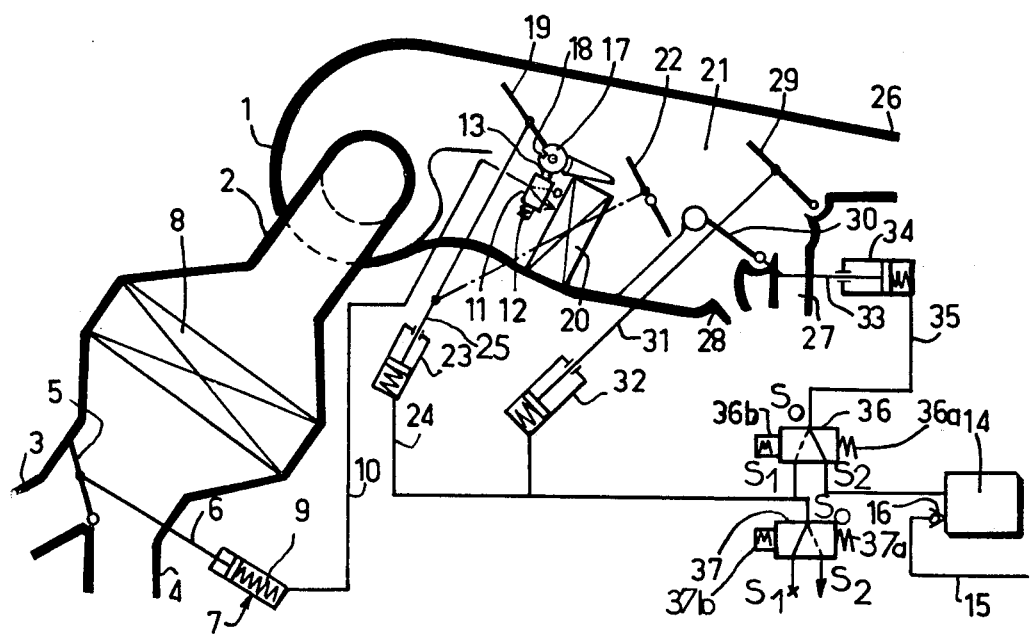

FIG. 1b represents the position of the components of the device in the air conditioning and windscreen demisting mode of operation.

Figure 1C:
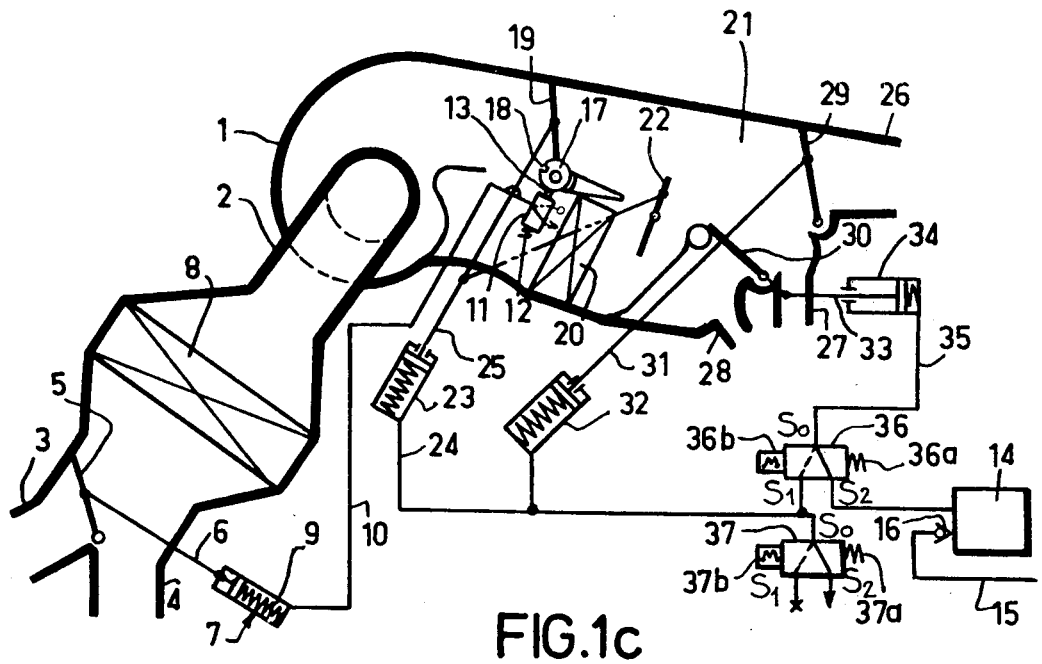
Figure 1D:
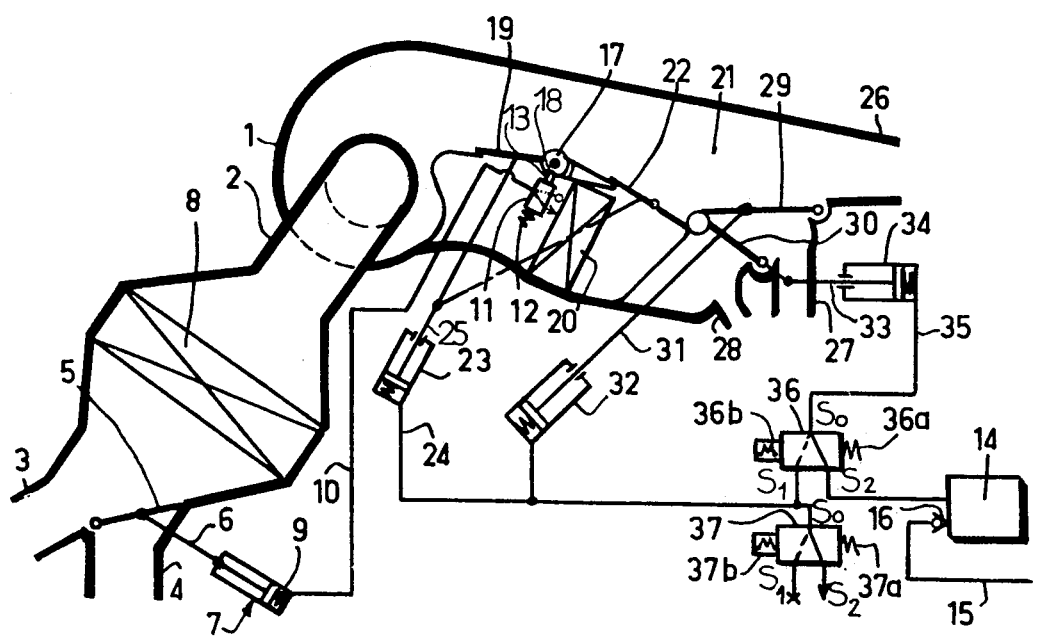

FIG. 1c represents the position of the components of the device when a priority windscreen defrosting function is being carried out. FIG. 1d represents the position of the components of the device in the inoperative state.

Figure 11:
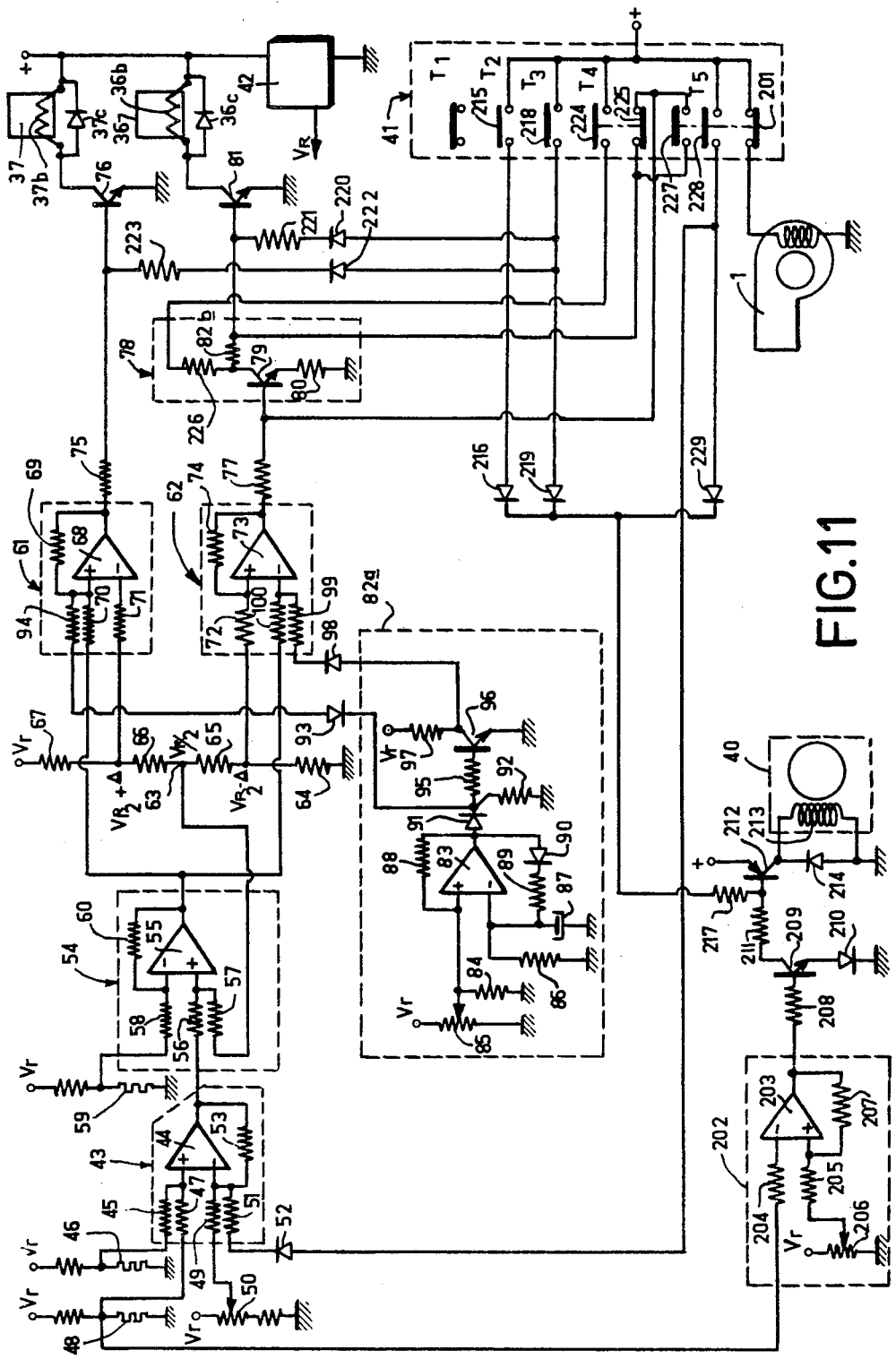
FIG. 11 is an electronic circuit diagram of a control system for the electromagnetic valves of the device shown in FIGS. 1a, 1b, 1c and 1d.

The automatic control achieved by means of the device which has just been described is a double threshold control of which the temperature of the propelled air (or the position of the cold air/hot air mixing flaps 19, 22) has been chosen as the controlling parameter. If the temperature of the propelled air only differs from a reference temperature, with which it is compared, by a value which is less than or at most equal to a predetermined first threshold difference $\Delta$, control equilibrium is considered to have been reached. This difference must not be considered as a control error but as a band within which control is considered to be satisfactory. The reference temperature value is computed by an electronic calculator from the values of the internal temperature of the vehicle cabin, the outside air temperature and the desired cabin temperature selected by the vehicle occupant(s). The details of this electronic circuit which, starting from this temperature comparison, generates the electrical signals for the electromagnetic valves 36 and 37, will be described subsequently; the said circuit is shown in FIG. 11.

The position of the various elements of the device, for normal, or economic functioning by automatic control, is shown in FIG. 1a. When the temperature of the outlet air is within the control band, the electronic control circuit does not send any signal to the electromagnetic valves 36 and 37. As a result, the two electromagnetic valves make the connection $S_0S_1$, which corresponds to the rest position of each electromagnetic valve, thereby isolating the lines 24 and 35 both from the atmosphere and from the sub-atmospheric pressure in the suction accumulator reservoir 14. The flaps 19, 22, 29 and 30 remain in the position in which they are in FIG. 1a. The mixing flap 19 is in an intermediate position between its two extremes where the tappet 13 is unable to enter the cam recess 18, so the line 10 is at atmospheric pressure, so that the flap 5 selects the supply of atmospheric air to the channel 2 introduced through the fresh air conduit 4. If control equilibrium can be achieved for the extreme position of the flap 19, which isolates the air-warming heat exchanger 20, the tappet 13 will then enter the recess 18, so that the line 10 is communicated to the pressure of the accumulator reservoir 14; the flap 5 then shuts off the conduit 4, opening the cabin extraction conduit 3, so that the system works by recycling, which does not present a problem because the equilibrium control band has been reached.

If the equilibrium control band has not been reached, and it becomes necessary to increase the temperature of the outlet air, the electronic circuit to the electromagnetic valves does not send any signal to the electromagnetic valve 36 although it does supply the electromagnetic valve 37 with a square wave signal having a frequency of about 1 Hz, and a mark/space ratio of 1:5. The movable valve member of the electromagnetic valve 37 is thus subjected to an alternating movement, such that the connection $S_0S_2$ is held during each signal pulse and the connection $S_0S_1$ is held during the gap between signal pulses. Since the electromagnetic valve 36 is not energised, the line 35 is always connected to the port $S_1$ of the valve 36, (that is to say to the port $S_0$ of the valve 37) and is thus, by means of valve 37, held in communication with the atmosphere during a signal pulse to electromagnetic valve 37. The pressure in the lines 24 and 35 will thus rise progressively during the square wave signal mode so that the rods of the jacks 23, 32 and 34 extend from the jacks. The flap 19 thus sends a higher proportion of air onto the heat exchanger 20 for warming, and at the same time the flap 30 sends a higher proportion of the hot air through the conduit 28 than through conduit 27, which makes it possible to take account of the fact that it is always desirable to keep the head of the vehicle occupant in a zone of air cooler than that around the feet.

Figure 9:
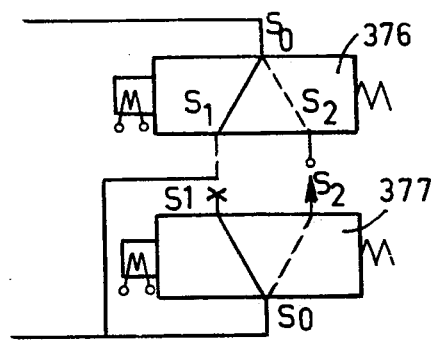

In the same way, if the measured temperature of the propelled air is higher than the reference temperature and is outside the control band, the circuit of FIG. 9 sends the electromagnetic valve 36 a square wave signal identical to that which was previously sent to the electromagnetic valve 37; furthermore, no signal whatsoever is now sent to the electromagnetic valve 37. The electromagnetic valve 37 thus maintains the connection $S_0S_1$. During each signal pulse to the electromagnetic valve 36, the connection $S_0S_1$ is held, which reduces the pressure prevailing in the line 35. During the gap between signal pulses, the electromagnetic valve 36 holds the connection $S_0S_1$, which balances the pressures of the lines 24 and 35. In this way the pressures prevailing in the lines 24 and 35 can be reduced gradually towards the lower limit of this reduction, namely the sub-atmospheric pressure prevailing in the suction accumulator reservoir 14. The gradualness of the reduction depends on the mark/space ratio of the pulsed signal. The piston rods of the jacks 23, 32 and 34 extend so as to compress the springs of the jacks; the flap 19 reduces the proportion of the fan outlet air sent across the heat exchanger 20 for warming; the flap 29 increase the proportion of the outlet air sent from zone 21 into the cabin air nozzles through the conduit 26; the flap 30 increase the proportion of the remainder of the air to be sent across the windscreen and reduces the proportion of this remainder of air which will be sent towards the feet of the user.

FIG. 1b shows the position of the elements of the device if the occupant(s) have selected functioning by automatic control, together with a windscreen demisting function. In this case, the temperature of the propelled air is controlled automatically but all the air is sent through the upper conduit 26, that is to say the flap 30 shuts off the inlet of the conduit 28. In this type of functioning, the compressor associated with the heat exchanger 8 is brought into operation. When control equilibrium has been reached, that is to say when the temperature of the propelled air is within the predetermined control band, the feed circuit of the electromagnetic valves 36 and 37 sends a continuous signal to the electromagnetic valve 36 and does not send any signal to the electromagnetic valve 37. Hence, the connection $S_0S_2$ is made in the electromagnetic valve 36 and the connection $S_0S_1$ in the electromagnetic valve 37. The line 35 is brought into permanent connection with the suction accumulator reservoir 14 so that the piston rod 33 of the jack 34 is retracted into the jack, which causes the flap 30 to shut off the inlet of the conduit 28. Furthermore, the conduit 24 is isolated, so that the jacks 23 and 32 remain in the position in which they are shown in FIG. 1a, corresponding to control equilibrium.

If the temperature of the outlet air from zone 21 is too low, the electromagnetic valve control circuit maintains the continuous signal sent to the electromagnetic valve 36 but furthermore sends to the electromagnetic valve 37 a square wave signal identical to that which has been used before. During the pulse duration of the square wave signal, the electromagnetic valve 37 thus holds the connection $S_0S_2$, that is to say brings the line 24 into communication with the atmosphere. The pressure in the line 24 thus increases gradually, causing the flaps 19 and 29 to move towards the right of the Figure causing a larger amount of air to pass onto the air-warming heat exchanger 20 and causing a larger amount of the now warmer outlet air from zone 21 to be sent into the conduit 27. This gradual movement of the flaps 19 and 29 takes place until control equilibrium has been reached.

When, on the other hand, the temperature of the outlet air is higher than the reference temperature, the electromagnetic valve feed circuit does not send any signal to the electromagnetic valve 37 and sends a square wave signal to the electromagnetic valve 36. This square wave signal has been chosen, in this example, to be the signal which is complementary to the previously used square wave signal (i.e. a square wave signal having the inverse mark/space ratio, in this case 1:5) because the complementary signal can be very easily produced in the circuit of FIG. 9. Nevertheless, a different signal can be used and the mark/space ratio of the pulsed signal need not be related to the mark/space ratio of the previously used signal. It should furthermore be noted that the mark/space ratio for the two signals in question can very easily be a function of the difference between the measured temperature and the reference temperature, instead of being fixed. However, in the example described, this ratio is fixed, so as to make the device simpler.

On this assumption that the temperature of the outlet air must be lowered, the electromagnetic valve 37 maintains the connection $S_0S_1$ whilst during the pulses of the said complementary signal the electromagnetic valve 36 makes and holds a connection between the suction accumulator reservoir 14 and the line 35; this connection is maintained for a longer period than the connection $S_0S_1$ between the lines 35 and 24 so the jack 34 will maintain the flap 30 in the position where it closes the conduit 28, while nevertheless the pressure in the line 24 gradually decreases causing the flaps 19, 22 and 29 to move towards the left. The amount of air sent onto the air-warming heat exchanger 20 decreases, thereby lowering the temperature of the outlet air from zone 21. At the same time, the amount of air sent into the cabin air nozzles through the conduit 26 increases, to take into account the fact that it is always desirable to keep the head of an occupant in a zone of air cooler than that around the feet.

With this type of functioning, together with a windscreen demisting function, movement of the flap 5 takes place in exactly the same way as for the type of functioning shown in FIG. 1a.

The device furthermore makes it possible to achieve a type of priority functioning which ensures that the windscreen is defrosted (see FIG. 1c). In this type of priority functioning, the compressor associated with the air-cooling heat exchanger 8 is disenabled, and the conditioning air must necessarily be passed entirely onto the windscreen through the channel 27 and must be as hot as possible, that is to say all the outlet air from fan must be blown across the air-warming heat exchanger 20. To achieve this type of functioning, a continuous signal is applied to both of the electromagnetic valves 36 and 37. Under these conditions, the connection $S_0S_2$ is made for both electromagnetic valves. The line 36 is brought into direct communication with the suction accumulator reservoir 14, so that the jack 34 moves the flap 30 to shut off the conduit 28. Furthermore, the connection $S_0S_2$ of the electromagnetic valve 37 opens the line 24 to the atmosphere, so that the jacks 32 and 23 push the respective flap 29 and the pair of linked flaps 19 and 22 into their extreme position towards the right in FIG. 1c, which on the one hand shuts off the conduit 26 and on the other hand directs all the outlet air from fan 1 across the air-warming heat exchanger 20. In view of the position of the flap 19, the tappet 13 is pushed back by the cam 17 so that the air line 10 is open to atmosphere, which brings the flap 5 into the position where it shuts off the conduit 3. It can thus be seen that this energisation state of the electromagnetic valves 36 and 37 achieves the desired priority function of windscreen defrosting.

Finally, FIG. 1d represents the state of the elements of the device in the inoperative condition. The electromagnetic valve control circuit does not send any signal to the electromagnetic valve 37 and sends to the electromagnetic valve 36 a square wave signal like that used for the "normal" and "economical" air conditioning automatic control. Of course, when the device is inoperative, the fan 1 and the compressor associated with the heat exchanger 8 are no longer driven by their respective motors. The type of energisation state indicated just above, for the electromagnetic valves results in the connection $S_0S_1$ being made for the electromagnetic valve 37; on the other hand the electromagnetic valve 36 oscillates, as has already been explained, between the connection $S_0S_2$ and the connection $S_0S_1$, which gradually brings the pressure in the lines 35 and 24 down to a valve equal to the sub-atmospheric pressure in the suction accumulator reservoir 14. The piston rods of the jacks 23, 32 and 34 are now completely retracted so that the air-warming heat exchanger 20 is entirely isolated and the conduit 26 is in direct communication with the now inoperative fan 1, the channel 2 and the recycling or cabin air extraction conduit 3. In fact, in its extreme position the flap 19, by means of recess 18, allows the movable member of the distributor 11 to move with the result of bringing the line 10 and the jack 7 into communication with the suction accumulator reservoir 14 and hence bringing the channel 2 into communication with the recycling conduit 3. The device thus provides an open path for circulating air, connected at its two ends to the cabin.

It will be seen that the use of two electromagnetic valves which are controlled by continuous signals or by pulsed signals makes it possible to ensure that control takes place without it being necessary to provide pressure modulators and without at the same time excluding the achievement of priority functions.

FIGS. 2 to 10 schematically represent various types of coupling of two electromagnetic valves identical to the electromagnetic valves 36 and 37 used to feed the drive jacks for the flaps of an air conditioning device according to the invention. It will be appreciated, from the preceding description, that the device according to the invention comprises two movable means, namely on the one hand the flap for miving the hot air and the cold air, and on the other hand the flap which controls how the outlet air from the mixing zone 21 is distributed between the stream passed across the windscreen and the upper and the lower conduit. The second embodiment is for use in a device which only comprises these two flaps, namely the mixing flap and the distribution flap, whilst the first embodiment is for use with a more complex device comprising a larger number of flaps. However, the air conditioning function can be achieved provided the device is suitably able to drive, in accordance with the user's requirements, the two basic control flaps, namely the mixture flap and the distribution flap. Consequently FIGS. 2 to 10 show different ways of coupling two electromagnetic valves for achieving at least one automatic type of control and at least one priority function. The methods of coupling are shown independently of the jacks of the flaps being controlled, and it will be indicated below how the connection is made between the pair of electromagnetic valves and the two drive jacks associated with the mixture flap and the distribution flap. In all these types of coupling, the two electromagnetic valves are identical to one another and identical to the electromagnetic valves 36 and 37 previously described.

Figure 2:
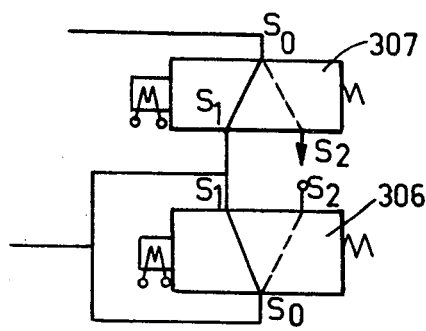
FIGS. 2 to 10 show nine separate further ways of coupling the two electromagnetic valves of the device according to the invention, i.e. different ways than the coupling employed in FIGS. 1a, 1b, 1c and 1d.

FIG. 2 shows that the two electromagnetic valves have been denoted by 306 and 307. The two ports $S_1$ are connected to one another and connected to the port $S_0$ of the electromagnetic valve 306 as well as to the distribution flap actuator jack. The port $S_0$ of the electromagnetic valve 307 is connected to the actuator jack for the mixing flap. The port $S_2$ of the electromagnetic valve 307 is connected to atmospheric pressure and the port $S_2$ of the electromagnetic valve 306 is connected to a suction accumulator reservoir. Under these conditions, the device is rendered inoperative by applying to the electromagnetic valve 306 a continuous signal and by not applying any signal to the electromagnetic valve 307; automatic control is achieved by applying to one or other of the two electromagnetic valves with a continuous signal and the "defrosting" priority function is achieved by feeding the two electromagnetic valves with a continuous signal. Of course, "economical" automatic control can be achieved by cutting off the feed to the compressor of the refrigeration circuit.

Figure 3:
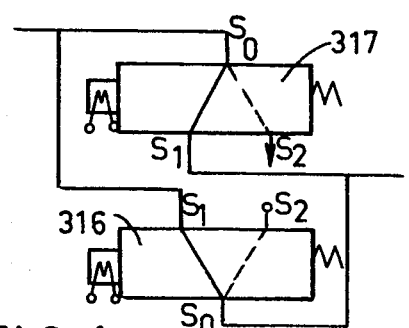

FIG. 3 shows another way of coupling two electromagnetic valves, in this case referenced 316 and 317. The port $S_1$ of the electromagnetic valve, 317 is connected to the port $S_0$ of the electromagnetic valve 316, and this connection feeds the jack for the distribution flap. The port $S_1$ of the electromagnetic valve 316 is connected to the port $S_0$ of the electromagnetic valve 317, and this connection feeds the actuator jack of the mixing flap. The port $S_2$ of the electromagnetic valves 316 and 317 are respectively connected to the suction accumulator reservoir and to atmospheric pressure. When the same modes of electrical control of the electromagnetic valves are selected as in the device of FIG. 2, the same operating modes are achieved.

Figure 4:
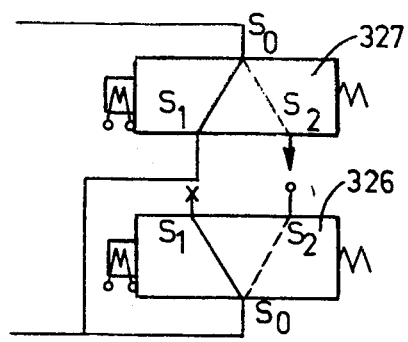

FIG. 4 shows that the electromagnetic valves 326 and 327 have their ports $S_2$ connected like the electromagnetic valves 316 and 317 respectively. The port $S_0$ of the electromagnetic valve 326 is connected to the port $S_1$ of the electromagnetic valve 327 and to the distribution actuator. The port $S_1$ of the electromagnetic valve 326 is blanked off. The port $S_0$ of the electromagnetic valve 327 is connected to the mixture actuator. It is found that, when the electromagnetic valves are energised electrically in the same modes as indicated for the device of FIG. 2, the same operating modes are achieved.

The embodiments of FIGS. 2 to 4 only use continuous control signals and although they do allow for "defrosting" (by sending all the air through the air-warming heat exchanger and all of this hot air onto the windscreen) they do not make it possible to achieve the "demisting" function (sending all the air at a controlled temperature onto the windscreen). Also by using only a continuous type of signal, the embodiments of FIGS. 2, 3 and 4 operate the jacks of the mixing and distribution flaps on an "all or nothing" basis.

Figure 5:
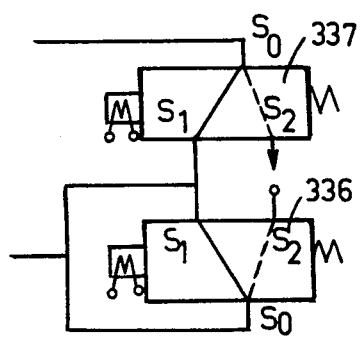
Figure 6:
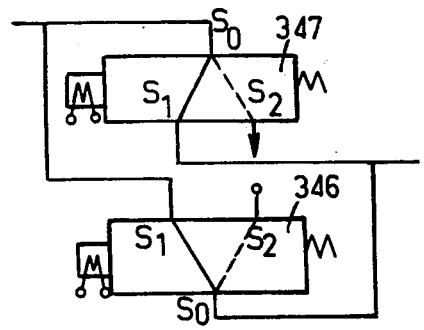
Figure 7:
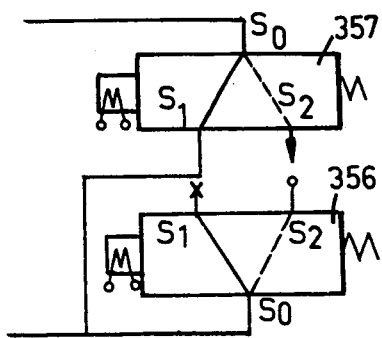

FIGS. 5 to 7 show three types of coupling which again do not allow for the demisting function; with these types of coupling, it is necessary to use either continuous signals or square wave signals for controlling the electromagnetic valves.

FIG. 5 shows that the electromagnetic valves 336 and 337 have their ports $S_2$ connected to the suction accumulator pressure reservoir and to atmosphere, respectively. The two ports $S_1$ of the two electromagnetic valves are connected to one another and to the port $S_0$ of the electromagnetic valve 336, and this connection controls the actuator for the distribution. The port $S_0$ of the valve 337 is connected to the actuator of the mixing flap. It will be seen that the device is rendered inoperative by failure to apply any signal to the electromagnetic valve 337 and by feeding the electromagnetic valve 336 with a square wave signal. Automatic control (normal or economical depending on whether the compressor of the refrigeration unit is functioning or not) is achieved by feeding the two electromagnetic valves with square wave signals. The defrosting priority function is achieved by feeding the two electromagnetic valves with continuous signals.

FIG. 6 shows that the two electromagnetic valves 346 and 347 have their ports $S_2$ connected into the rest of the pneumatic circuit in the same manner as for the electromagnetic valves 336 and 337, respectively, of FIG. 3. The port $S_1$ of one of the electromagnetic valves is connected to the port $S_0$ of the other electromagnetic valve and each of the two connections is linked to one of the actuators. The actuator of the mixing flap is linked to the port $S_0$ of the electromagnetic valve 347, and the actuator of the distribution flap is linked to the port $S_0$ of the electromagnetic valve 346. On energising the electromagnetic valves as was described in connection with the FIG. 5 coupling system, the same modes of functioning are achieved.

FIG. 7 shows that the two electromagnetic valves 356 and 357 have their ports $S_2$ connected in the same way as for the electromagnetic valves 336 and 337, respectively of FIG. 3. The port $S_1$ of the electromagnetic valve 357 is connected to the port $S_0$ of the electromagnetic valve 356 and to the actuator of the distribution flap. The port $S_0$ of the electromagnetic valve 357 is connected to the actuator of the mixing flap. The port $S_1$ of the electromagnetic valve 357 is blanked off. It is found that on applying to the two electromagnetic valves signals identical to those which have been defined for the coupling of FIG. 5, the same operating modes are achieved.

Figure 8:
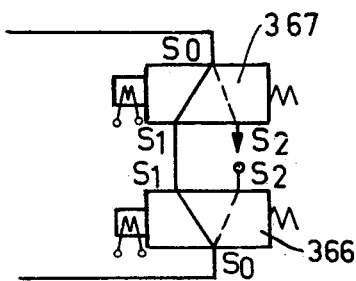
Figure 10:
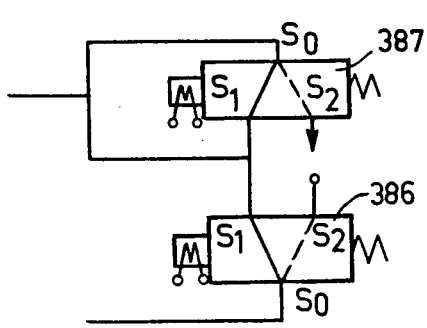

FIGS. 8 to 10 represent three further types of coupling of two electromagnetic valves to make it possible to obtain, by using continuous signals and square wave signals for control purposes, not only the "defrosting" priority function but also the "demisting" function.

FIG. 8 shows that the two electromagnetic valves 366 and 367 have their ports $S_2$ connected in the same way as for the electromagnetic valves 336 and 337 respectively. The port $S_0$ of the electromagnetic valve 366 is connected to the actuator of the distribution flap and the port $S_0$ of the electromagnetic valve 367 is connected to the actuator of the mixing flap. The two ports $S_1$ of the two electromagnetic valves are connected to one another. It will be seen that the device can be rendered inoperative by not applying any signal to the electromagnetic valve 367 and by sending a square wave signal to the electromagnetic valve 366. Automatic control ("normal" or "economical", depending on whether the compressor of the refrigeration unit is or is not fed) is achieved by applying a square wave signal to the two electromagnetic valves. The "demisting" function is achieved by applying to the electromagnetic valve 366 a square wave signal complementary to that previously used for automatic control, and sending to the electromagnetic valve 367 a square wave signal identical to that used for automatic control. The defrosting function is achieved by sending a continuous signal both of the two electromagnetic valves.

In FIG. 9, the electromagnetic valves 376 and 377 have their respective ports $S_2$ connected to the sub-atmospheric pressure of a suction accumulator reservoir and to atmosphere. The port $S_0$ of the electromagnetic valve 377 is connected to the port $S_1$ of the electromagnetic valve 376 and to the actuator of the mixing flap. The port $S_0$ of the electromagnetic valve 376 is connected to the actuator of the distribution flap. The port $S_1$ of the electromagnetic valve 377 is blanked off. The use of the control signals described for the type of coupling shown in FIG. 8 makes it possible to achieve the same operational modes.

FIG. 10 shows another method of coupling of two electromagnetic valves 386 and 387. The port $S_2$ of these two electromagnetic valves are connected, respectively, to the sub-atmospheric pressure of a suction acuumulator reservoir and to atmosphere. The port $S_0$ of the electromagnetic valve 386 is connected to the actuator of the distribution flap. The ports $S_1$ of the two electromagnetic valves are connected to the port $S_0$ of the electromagnetic valve 387 and to the actuator of the mixing flap. The use of the same control signals for the two electromagnetic valves as described for the coupling of FIG. 8 makes it possible to achieve the same operational modes.

It will be seen that the couplings represented in FIGS. 8 to 10 make it possible to achieve the demisting and defrosting priority functions in addition to automatic control of air conditioning.

FIG. 11 represents schematically an electronic circuit which can control the two electromagnetic valves of the embodiment of FIGS. 1a, 1b, 1c, 1d, as well as the fan 1 and the compressor 40 associated with the air-cooling heat exchanger 8 of the refrigeration unit.

The entire device is controlled by a selector unit 41 operated by the user. The selector unit 41 comprises five keys numbered $T_1$ to $T_5$, the key $T_5$ being independent of the other four, and the depression of one of the keys $T_1$, $T_2$, $T_3$ or $T_4$ (for example $T_1$ in the case Illustrated in FIG. 9) causes the release of the other keys (for example $T_2$, $T_3$ and $T_4$ in the drawing). The selector unit 41 is operated by the user in accordance with the type of air conditioning desired. The key $T_5$, when depressed, renders the device inoperative and, when released (as illustrated in FIG. 9) brings the device into action. Depressing the key $T_1$ causes the release of the keys $T_2$, $T_3$ and $T_4$ and corresponds to the device functioning with normal automatic control (that is to say with the refrigeration compressor 40 operating). Depression of the key $T_2$ corresponds to the device functioning in the "economical" automatic control mode. Depression of the key $T_3$ corresponds to the "defrosting" priority function and depression of the key $T_4$ corresponds to the "demisting" function.

The circuit shown requires a d.c. supply provided by the vehicle electrical system, the positive terminal being denoted by the sign + and the negative terminal being connected to earth. A controlled voltage $V_R$ of 9 volts is generated in the circuit by means of a controller 42, and is used to energise the electronic components.

The circuit includes a calculator 43, essentially consisting of an operational amplifier 44. The positive terminal of the amplifier 44 is connected on the one hand via the resistance 45 to a voltage taken off the terminals of a thermistor 46 and representing the air temperature inside the cabin and, on the other hand via a resistance 47 to a voltage taken off the terminals of another thermistor 48 representing the air temperature outside the vehicle. Onto the negative terminal of the amplifier 44 there is applied, via a resistance 49, a voltage from a potentiometer 50 representing the desired cabin air temperature as selected on the potentiometer by the user himself. This negative input is also connected via a resistance 51 and a diode 52 to the key $T_5$ of the selector unit 41, and by the contact strip 228 of this key $T_5$ to the positive terminal of the battery when the said key $T_5$ is released that is to say when the device is inoperative. When the device is in operation (as in the case shown in FIG. 11) the resistance 51 does not apply any voltage to the negative input of the amplifier 44. The negative input of the amplifier 44 is connected by a resistance 55 to the output of the amplifier.

The calculator 43 which has just been described computes, in accordance with the actual cabin air temperature, the outside air temperature and the desired cabin air temperature set by the user, a reference value which is compared with the temperature of the outlet air from the mixing zone by means of the comparator 54. The comparator 54 essentially consists of an operational amplifier 55 whose positive input receives, via the resistance 56, the reference voltage computed by the calculator 54 and, via the resistance 57, the voltage $V_R/2$ which is added to the preceding voltage. To the negative terminal of the amplifier 55 there is applied via a resistance 58, a voltage taken off the terminals of a thermistor 59 representing the temperature of the outlet air stream. The negative input terminal of the amplifier 55 is connected by a resistance 60 to the output of the said amplifier. The output voltage of this amplifier has a value equal to the voltage $V_R/2$ increased by a voltage proportional to the difference between the reference value obtained from the calculator 43 and the measured value taken off the terminals of the thermistor 59. This output voltage of the comparator 54 is then compared, in the two comparators 61 and 62, with the two threshold voltages $(V_R/2+\Delta)$ and $(V_R/2-\Delta)$. The voltage $V_R/2$ is obtained at the point 63 by means of a divider bridge consisting of four series resistances 64, 65, 66 and 67 connected between earth at one end and the voltage $V_R$ at the other end of the bridge. The voltage $(V_R/2+\Delta)$ is obtained between the resistances 66 and 67; the voltage $(V_R/2-\Delta)$ is obtained between the resistances 64 and 65; the voltage of the point 63 is that used to feed the resistance 57.

The comparator 61 essentially consists of an operations amplifier 68 whose negative input terminal receives the voltage $(V_R/2+\Delta)$ and whose positive input terminal receives the output voltage of the comparator 54. A resistance 69 is connected across the positive input terminal of the amplifier 68 and the output of this amplifier. The resistances 70 and 71 are located in the positive and negative inputs of the amplifier 68. The output of the comparator 61 is energised when the output voltage of the comparator 54 is greater than $(V_R/2 + \Delta)$.

Equally, in the comparator 62, the voltage $(V_R/-\Delta)$ delivered via the resistance 72 to the positive input of an operational amplifier 73 is compared with the output voltage of the comparator 54 supplied to the negative input. A resistance 74 is connected between the positive input and the output of the amplifier 73. The output of the amplifier 73 is energised when the output voltage of the comparator 54 is less than $(V_R/2 - \Delta)$.

If the output voltage of the comparator 54 is between the two thresholds $(V_R/2 - \Delta)$ and $(V_R/2 + \Delta)$, neither of the two outputs of the comparator 61 and 62 is energised.

The output of the comparator 61 is connected, via a coupling resistance 75, to the base of a transistor 76 whose emitter is connected to earth whilst its collector is connected to the actuator solenoid 37b of the electromagnetic valve 37. When the output of the comparator 61 is energised the transistor 76 conducts and the electromagnetic valve 37 is operated.

The output of the comparator 62 is connected via a coupling resistance 77 to an inverter 78, consisting of a transistor 79 whose emitter is connected to earth via a resistance 80. The collector of the transistor 79 is connected to the base of a transistor 81 via a resistance 82b. The emitter of the transistor 81 is connected to earth, and its collector is connected to the actuator solenoid 36b of the electromagnetic valve 36. Those terminals of the solenoids 36b and 37b, which are not connected to the respective transistor 81 or 76 are connected to the positive input terminal of the control circuit. Diodes 36c, 37c respectively, are connected to the terminals of the solenoids 36b and 37b.

Before the output voltage of the comparator 54 is compared with the two thresholds $(V_R/2 + \Delta)$ and $(V_R/2 - \Delta)$ which constitute the control thresholds, the said output voltage is modulated with a signal obtained by means of a flip-flop 82a in order to be able to control the electromagnetic valves 36 and 37 not as a continuous signal but as a square wave signal. The flip-flop 82a essentially consists of an operational amplifier 83 whose positive input has a voltage applied to it via a resistance 85 fed by the voltage $V_R$ and is connected to earth via a resistor 84. The negative input of the amplifier 83 is connected to earth, in parallel with a resistance 86 and a condenser 87. The positive input of the said amplifier is connected to its output via a resistor 88. The negative input is also connected to the output via a variable resistor 89 and a diode 90. The output of the amplifier 83 is connected, via a diode 91, on the one hand to earth via the resistor 92 and on the other hand to the positive input of the amplifier 68 via a diode 93 and a resistor 94. Thus positive deviation relative to the reference value is modulated directly. Since the signal corresponding to the negative deviation is inverted by the comparator 62, it is necessary to invert the output of the flip-flop before using it to modulate this negative deviation signal. To do this, the output of the diode 91 is fed, via a coupling resistor 95, to the base of a transistor 96 whose emitter is connected to earth and whose collector is connected, on the one hand via a resistor 97 to the voltage $V_R$ and, on the other hand via a diode 98 and a resistor 99 to the negative input of the amplifier 73, which already receives the output voltage of the comparator 54 via the resistor 100.

Thus, once the deviation of the actual cabin air temperature measured by the thermistor 59 from the reference air temperature value computed by the calculator 43 is greater than a predetermined value $\Delta$, a square wave signal can be delivered to either the electromagnetic valve 36 or the electromagnetic valve 37 depending on whether the value is below and outside the band in which the control system is considered to be in equilibrium or is above and outside the control band. This corresponds to automatic control of the air conditioning as described with reference to FIG. 1a.

It will also be seen that when the key T5 is in the raised position, the motor of the fan 1 is energised by the vehicle electrical system via the contact strip 201. The compressor 40 should also be put into operation if the key T5 is in the raised position, provided the outside air is not sufficiently cold as to be able to serve, in itself, as the cold source. Hence, a voltage which is a measure of the outside air temperature is taken off the terminals of the thermistor 48 and this voltage is compared, in the comparator 202, with a reference value corresponding to the temperature limit beyond which the outside air is considered to be able to serve, in itself as the cold source. The comparator 202 essentially consists of an operational amplifier 203 whose negative input receives, via the resistor 204, the voltage taken off the terminals of the thermistor 48, whilst the positive input receives, via the resistor 205, a reference voltage taken off a rheostat 206. The positive input of the amplifier 203 is connected to its output by a resistor 207 and this output is connected by a coupling resistor 208 to the base of a transistor 209 whose emitter is connected to earth via a diode 210. The collector of this transistor 209 is connected by a coupling resistance 211 to the base of a transistor 212 whose emitter is connected to the positive supply terminal of the control circuit whilst its collector is connected to the solenoid 213 to energise the drive motor of the compressor 40. A diode 214 is connected in parallel to the terminals of the solenoid 213. When the outside air temperature is sufficiently low, the amplifier 203 delivers a zero voltage, which blocks the transistor 212 via the amplifier stage consisting of the transistor 209; this arrangement makes it possible to stop the compressor 40. On the other hand, for a high outside air temperature, the compressor 40 is automatically started as soon as the keys T4 and T1 of the selector unit 41 are depressed.

When the user processes the key T2 of the selector unit 41, this makes contact, via the contact strip 215, between the positive input terminals of the control circuit and the base of the transistor 212, via a diode 216 and a resistor 217. The transistor 212 is blocked and consequently the compressor 40 is disenabled. The remainder of the functioning of the circuit is idential to that which has been described earlier, so that depressing the key T2 of the selector unit 41 corresponds to "economical" air conditioning, with automatic control.

When the user depresses the key T3 of the selector unit 41, this makes contact, via the contact strip 218, between the positive supply terminal of the control circuit and the base of the transistor 212 via the diode 219 and the resistor 217. Consequently, the compressor 40 is disenabled. Furthermore, the positive supply terminal of the circuit becomes connected via a diode 220 and a resistor 221 to the base of the transistor 81 and also a diode 222 and a resistor 223, to the base of the transistor 76. As a result, the transistors 76 and 81 are saturated and the electromagnetic valves 36 and 37 are excited by a continuous signal. Hence, it can be seen that this type of feed of the electromagnetic valves 36 and 37 corresponds to the "defrosting" priority function.

Finally, if the user depresses the key $T_4$ of the selector unit 41, this acts on the contact strips 224 and 225, making the contact associated with the strip 224 and breaking the contact associated with the strip 225. Whilst the key $T_4$ was not depressed, the inverter stage 78 was shortcircuited by the connection between the resistor 82b and the base of the transistor 79, this connection having been made by the contact strip 225. When the key $T_4$ is depressed, the abovementioned connection is broken and the collector of the transistor 79 is connected to the positive supply terminal of the control circuit via the contact strip 224 and via the resistor 226. As a result, where the measured parameter has a value below and outside the control band around the reference value, the signal delivered to the electromagnetic valve 36 is a signal complementary to that which is delivered to the electromagnetic valve 37 if the measured value is above and outside the control band around the reference value. Furthermore, when control equilibrium has been reached the transistor 81 is saturated so that the electromagnetic valve 36 receives a continuous signal whilst the electromagnetic valve 37 receives no signal whatsoever; the same is true if the electromagnetic valve 37 receives a square wave signal. It is thus found that these feeds of the electromagnetic valves 36 and 37 correspond precisely to achieving the "demisting" function shown in FIG. 1b.

If the user wishes to render the air conditioning device inoperative, he depresses the independent key $T_5$, regardless of the position of the other keys $T_1$, $T_2$, $T_3$ and $T_4$. This depression of the key $T_5$ breaks the contact at the contact strip 201, thereby stopping the fan 1, but makes contact at the contact strips 227 and 228. The contact strip 228 connects the positive power supply terminal to the base of the transistor 212 via the diode 229 and the resistor 217, which blocks the transistor 212 and stops the compressor 40. Furthermore, making contact at the contact strip 228 connects the positive power supply terminal via the diode 52 and the resistor 51, to the negative input of the amplifier 44. This imbalances the amplifier 44 by applying a high voltage to the negative input, which again amounts to a demand for cooling in the cabin. As a result of the action of the automatic control system, this amounts both to applying a square wave signal to the electromagnetic valve 36 and to the absence of a signal at the electromagnetic valve 37. Regardless of the position of the key $T_4$, the inverter stage 78 is rendered inoperative by means of the contact strip 227 which short-circuits between the base and the collector of the transistor 79. It is found that this energization state of the electromagnetic valves, as well as the stopping of the air fan and of the coolant compressor corresponds to rendering the device inoperative as has been indicated in the earlier description and shown in FIG. 1d.

Of course the embodiments, described above merely by way of example, should in no way imply a limitation and can be modified in any desirable manner without thereby going outside the scope of the invention as defined by the following claims. Thus the air conditioning device according to the invention can, instead of only being controlled pneumatically as described above, instead be controlled hydraulically. Equally, the pressure accumulator reservoir employed may contain a fluid under any pressure which may be less or greater than atmospheric pressure.

We claim:

1. A device for air conditioning an enclosed space with at least one mode of automatic temperature control, such device comprising an air circulating fan; means defining different flow paths for conditioning air through the device; one heat exchanger means through which the conditioning air can pass as it travels along at least one of said paths; movable means for directing the flow of conditioning air along said different possible circulation paths in the device; at least two fluid pressure operated actuators; two electromagnetic valves associated with the actuators of the device so that each actuator is controlled by at least one of the two electromagnetic valves and is effective to drive said movable means, each of said electromagnetic valves having first, second and third valve ports, said first port of each valve being interconnected through the valve with said second port when the electromagnetic valve is de-energised, and with said third port when the electromagnetic valve is energised with a control signal; means to define a first fluid flow path for each valve including the said first and second ports of said valve; means to interconnect said first fluid flow paths of said two electromagnetic valves; two fluid feeds at different respective pressures; means connecting the two electromagnetic valves to respective ones of said two fluid feeds at different respective pressures; and means to connect at least one of said actuators to each of the two said first ports.

2. A device according to claim 1, and including means responsive to the mode of air conditioning chosen by the user, for feeding each electromagnetic valve either with a continuous electrical signal or with a low frequency discontinuous electrical signal.

3. A device according to claim 2, wherein said low frequency discontinuous electrical signal applied to the electromagnetic valve or valves is a square wave signal.

4. A device according to claim 2, wherein said third ports of the two electromagnetic valves are connected to the respective different pneumatic feeds.

5. A device according to claim 4, wherein one of said fluid feeds, connected to a first one of said electromagnetic valves, is a pressure accumulator reservoir containing air at a pressure different from atmospheric pressure; and the other of said fluid feeds, connected to the second of said electromagnetic valves, is a vent to atmosphere.

6. A device according to claim 1, 2, 3, 4 or 5, wherein the arrangement of the device is such that when it functions under automatic control, the mode of control established has a threshold facility such that the electromagnetic valve means will not receive any control signal as long as the measured value of a control parameter of the air conditioning to be achieved does not depart from a reference value of the said parameter by more than a predetermined threshold amount.

7. A device according to any one of claims 1 to 5, wherein said fluid pressure actuators of the movable means for directing the flow of conditioning air are pneumatic jacks each having a piston rod, and means spring biasing said piston rod for movement in one axial direction along the jack.

8. A device according to claim 7, wherein said movable means for directing the flow of conditioning air comprise pivoting flaps; and where means are provided to link the piston rod of each said jack to a respective one of said flaps to enable said jacks to control the pivoting movement of each flap.

9. A device according to any one of claims 1 to 5, wherein said heat exchanger means comprise first and second heat exchangers; and further including a coolant fluid compressor connected to said first heat exchanger to cool air passing through said first heat exchanger, and means connected to said second heat exchanger for warming air passing through said second heat exchanger, said air circulating fan being effective to circulate conditioning air through said first heat exchanger before said second heat exchanger.

10. A device according to claim 9, wherein it is capable of two modes of automatic control; namely a "normal" mode of control in which said coolant fluid compressor is functioning and an "economical" mode of control in which the compressor is inoperative.

11. A device according to any one of claims 1 to 5, including a plurality of outlet conduits from said device, and wherein the device is capable of an automatic mode of control which effects a priority function in which the whole of the conditioned air flow is directed towards a signle one of said outlet conduits.

12. A device according to claim 11, wherein said device is installed in an automobile vehicle for vehicle cabin air conditioning; and said priority function is windscreen demisting in which all the conditioned air passes towards the vehicle windscreen.

13. A device according to claim 12, wherein it is capable of two priority functions, namely a windscreen demisting function, and a windscreen defrosting function in which all the conditioned air is heated by said heat exchanger means and is directed towards said single outlet conduit towards the windscreen.

14. A device according to claim 9, wherein the device is capable of an instantaneous stop function in which the said coolant compressor and the air circulating fan are inoperative and said movable means are in an extreme position, corresponding to recycling of air from the air conditioned space back into the device.

15. A device according to claim 11, wherein said discontinuous electrical signal applied to the electromagnetic valve means is a square wave signal; and said electromagnetic valve means comprise two electromagnetic valves each fed with such a square wave signal from time to time during normal operation of the device in said mode of automatic control; and said demisting function is achieved by inverting the mark/space ratio of one of said square wave signals which is from time to time applied to the two electromagnetic valves during said air conditioning operation in said mode.

16. A device according to any one of claims 1 to 4, wherein during said mode of automatic control air conditioning is effected in dependance on a control parameter which is one of: the position of a cold air/hot air mixing flap, the temperature of the conditioning air entering the enclosed space to be conditioned, and the air temperature in this enclosed space.

17. A device according to any one of claims 1 to 5, wherein said movable means comprises pivoting flap means controlling hot air/cold air mixing and further flap means for controlling distribution of the conditioning air; and a first one of said actuator controls said hot air/cold air mixing flap means and a second of said actuators at least controls said further flap means.

18. A device according to claim 17, including diverter flap means for determining the entry of conditioning air into the device from the outside or from the inside of the enclosed space to be conditioned; a third of said actuators being effective to control said diverter flap means; and a flow distributor associated with said third actuator of the device said flow distributor being effective to control said hot air/cold air mixing flap means including a cam effective to control said flow distributor.

19. A device according to claim 18, including further flap means effective to isolate said first heat exchanger from the downstream part of the device when the hot air/cold air mixing flap means prevent the conditioning air from passing through said first heat exchanger, wherein said first actuator being effective to additionally control said further flap means.

20. A device according to any one of claims 1 to 5, when installed in an automobile vehicle such that the enclosed space to be conditioned is the vehicle cabin, and wherein said actuator means includes a first actuator which controls a flap having a first extreme position resulting in directing of the conditioning air solely to the face vents of the vehicle cabin, and a second extreme position resulting in flow of the conditioning air to ventilation conduits directed towards the feet of the vehicle occupants and towards the vehicle windscreen.

21. A device according to claim 6, and including an electronic circuit for electrically controlling the electromagnetic valves in which circuit a comparator continuously compares the measured value of said control parameter with said reference value of the said parameter, the output of said comparator being applied to a double threshold circuit which provides at least one electrical signal if the output of the comparator is outside the two abovementioned thresholds, means being provided for applying the said at least one signal to the electromagnetic valve means.

22. A device according to claim 21, and including calculator means for computing the reference value of said parameter in response to the outside air temperature, the selected temperature set by the user, and the air temperature measured inside the enclosed space to be conditioned.

* * * * *